Patented Nov. 27, 1951

2,576,442

UNITED STATES PATENT OFFICE 2,576,442

BIOLOGICAL OXYGEN DEMAND REDUCTION PROCESS

Joseph N. Borglin, Wilmington, Del., and Irene Woodcock, Upper Black Eddy, Pa., assignors, by direct and mesne assignments, to Hercules Powder Company, Wilmington, Del., a corporation of Delaware No Drawing. Application September 30, 1948, Serial No. 52,126

5 Claims. (Cl. 210—2)

This invention relates to a process for reducing the biological oxygen demand of an aqueous liquid medium containing organic matter. More particularly, it relates to a process for reducing the biological oxygen demand of water contaminated with organic matter by the treatment thereof with an $\alpha,\alpha$-dialkylarylmethyl hydroperoxide.

It is well known that water contaminated with organic substances such as those found in sanitary sewage and various industrial wastes will gradually rid itself of such pollution, if allowed free access to air. This self-purification is primarily a biological process. The organic materials present in the water are assimilated by bacteria with the resultant production of carbon dioxide, nitrates, nitrites, and the like. Although the direct action of the oxygen contained in aerated or running waters on the organic matter present therein is of comparatively little significance in this biological process, some decomposition of such material is no doubt thereby effected. Furthermore, in addition to sustaining the life of the bacteria and effecting some direct oxidation of the organic matter present in the water, this dissolved oxygen acts as a neutralizing and deodorizing agent for some of the gases resultant from the biological decomposition process.

The biological decomposition of the organic materials present in water is normally effected by both anaerobic and aerobic bacteria. Anaerobic bacteria utilize chemically combined oxygen in the decomposition process. Aerobic bacteria, however, function only in the presence of dissolved free oxygen, nitrates, or nitrites. Aerobic decomposition of organic material, therefore, results in depletion of the oxygen dissolved in any body of water in which such decomposition takes place. The terms "Biochemical Oxygen Demand" and "Biological Oxygen Demand" (hereinafter denoted as B. O. D.) are understood by the art to denote the quantity of oxygen required for the complete biochemical oxidation of the decomposable organic matter contained in a specific amount of a particular liquid.

Sanitary sewage and many industrial wastes are characterized by a very high B. O. D. These materials are normally ultimately disposed of by discharge into a natural watercourse. If a large volume of such materials is deposited into a watercourse, substantial and perhaps total depletion of the dissolved oxygen contained in such watercourse may result for some distance from the point where the waste materials are introduced. This dissolved oxygen is essential to the existence of the fauna and flora of the stream. Consequently, unless the B. O. D. of the waste material is reduced prior to discharge into the stream, septic conditions may result throughout a wide area. One of the primary functions of any sewage or waste disposal plant is, therefore, to reduce the B. O. D. of material treated therein. This problem is of particular significance in many modern industries. The wastes from slaughter houses, canneries, tanneries, distilleries, organic chemical plants, corn products plants, creameries, pharmaceutical and biological plants, pulp and paper plants, beet sugar plants, packing houses, and yeast plants are equivalent in total B. O. D. to the normal sanitary sewage of a city of many thousands of persons. Municipal sewage disposal plants are, in many instances, inadequate or otherwise incapable of treating large quantities of these industrial wastes. Hence, the industries themselves have been forced to develop and install their own waste disposal systems.

Prior art sewage treatment processes generally achieve reduction in the B. O. D. of the material treated by effecting substantially complete anaerobic or aerobic decomposition of the organic materials contained in the wastes prior to ultimate discharge into natural disposal sources. In these prior art processes, aerobic decomposition is customarily effected in the aeration tanks of activated sludge plants, in trickling filters, in intermittent sand filters, in contact beds, and the like, or in a combination of these, customarily after dilution of the waste material. All of these prior art processes function by essentially the same method, and differ essentially only in the physical structure in which the aerobic decomposition process is carried out. None of these prior art methods have proved entirely satisfactory. Consequently, the discovery of a means whereby the B. O. D. of waste materials generally may be economically and efficaciously reduced to such an extent that the waste materials may be safely introduced into a natural watercourse has constituted a major problem in the art.

Now in accordance with this invention, it has been discovered that the B. O. D. of liquids containing organic matter may be substantially reduced by treating the liquids with an α,α-dialkylarylmethyl hydroperoxide. These organic hydroperoxides support the life of the aerobic bacteria which decompose the waste organic material present. In addition, these hydroperoxides effect a direct oxidation of some of the organic matter present and serve to neutralize and deodorize some of the gases resultant from the biological decomposition process. These organic hydroperoxides may be utilized simply by addition thereof to the waste material to be treated, with or without dilution. If desired, however, these hydroperoxides may be employed in conjunction with conventional prior art sewage treatment devices, such as aeration tanks, activated sludge tanks, trickling and intermittent filters, and the like to effect a more complete reduction in the B. O. D. of the waste materials treated. Likewise, the organic hydroperoxides of this invention may be added to the effluent from any of the conventional sewage treatment processes to effect a still further reduction in the B. O. D. thereof. If the material treated is septic or contains none or an ineffective number of the aerobic bacteria essential to the aerobic biological decomposition process, such organisms may, if desired, be added thereto, either before or after the introduction of the organic hydroperoxides.

The organic hydroperoxides which may be utilized in accordance with the process of this invention are α,α-dialkylarylmethyl hydroperoxides. These α,α-dialkylarylmethyl hydroperoxides have the following structural formula

in which $R_1$ and $R_2$ represent alkyl groups, Ar represents a substituent selected from the group consisting of aryl and alkaryl groups and X represents the hydroperoxy (—OOH) group. As illustrative of the alkyl-substituted aromatic organic compounds which may be oxidized, p-cymene, cumene, and diisopropylbenzene may be mentioned. These compounds lead to α,α-dimethyl-p-methylbenzyl, α,α-dimethylbenzyl, and α,α-dimethyl-p-isopropylbenzyl hydroperoxides, respectively. Also, in the case of diisopropylbenzene, there may be obtained α,α,α',α'-tetramethyl-p-xylylene dihydroperoxide. These compounds also may be named as aryl(dialkyl)methyl hydroperoxides; for example, α,α-dimethylbenzyl hydroperoxide may be designated as phenyl(dimethyl)methyl hydroperoxide. The aryl and alkaryl groups need not be derived from benzene as is the case in the aforementioned compounds, for compounds containing aromatic nuclei derived from naphthalene, anthracene, phenanthrene, and the like also are operable. These compounds, when solid in nature, may be dissolved in a suitable solvent during oxidation. The aryl group may be substituted with alkyl groups such as methyl, ethyl, propyl, isopropyl, butyl, isobutyl, secondary butyl, tertiary butyl, and the like to give alkaryl substituents, the same alkyl groups also being representative of $R_1$ and $R_2$ in the structural formula. $R_1$ and $R_2$ may be either the same or different.

These organic hydroperoxides are especially advantageous in the treatment of industrial wastes and other liquids containing large quantities of decomposable organic matter. By virtue of their use, the B. O. D. of such waste materials may, without the installation of expensive, conventional waste disposal equipment, be reduced to such an extent that the waste may safely be introduced into natural disposal sources. Furthermore, if desired, these hydroperoxides may be utilized in conjunction with conventional waste disposal equipment and processes or added to the effluent therefrom to effect a more substantial reduction in B. O. D. than would otherwise be possible.

Having thus indicated the nature and purpose of this invention, the following examples are offered to illustrate the practice thereof. As previously noted, the expressions "Biochemical Oxygen Demand" and "Biological Oxygen Demand" are generally understood to denote the total amount of oxygen required for the complete biochemical oxidation of the decomposable matter contained in a certain amount of a particular liquid. An incubation period of several weeks is required for such a complete determination. This long period of incubation is impractical as a standard. Consequently, a much shorter period of incubation is used for analytical purposes. Incubation for five days at 20° C. is customary. All of the B. O. D. values recorded in the ensuing examples were so determined in accordance with the procedure outlined by the American Public Health Association. This procedure is set forth in detail in the book entitled Standard Methods for the examination of Water and Sewage, 9th ed. (1946), pp. 139–143. In brief, this procedure entails diluting a sample of the material to be treated with a known volume of water; seeding the diluted sample, if sterile, with aerobic bacteria; and determining the amount of dissolved oxygen at the beginning and end of the five-day incubation period. Intervening dissolved oxygen determinations may be made, if desired. The depletion in dissolved oxygen as indicated by the difference in amount thereof present in the sample before and after incubation is corrected for loss due to the presence of the dilution water. This correction is determined from a similarly incubated sample of the dilution water. This loss in dissolved oxygen, expressed in parts per million, is then divided by the percentage concentration of the sample expressed as a decimal to determine the B. O. D. in parts per million of the material tested.

EXAMPLE I

α,α-dimethylbenzyl hydroperoxide was utilized to effect a reduction in the B. O. D. of 30 ml. of waste resultant from the manufacture of No. 2 rope paper by a large paper company. The α,α-dimethylbenzyl hydroperoxide utilized was prepared by the air oxidation of cumene and was employed in admixture with about 28% of α,α-dimethylbenzyl alcohol, acetophenone, and other secondary reaction products. This α,α-dimethylbenzyl hydroperoxide material was characterized by a refractive index of 1.525 at 20° C., a specific gravity of 1.051 at $$\left(\frac{15.6°\ C.}{15.6°\ C.}\right)$$

and an active oxygen content of 5.5%.

The organic material contained in the paper mill waste treated consisted primarily of the following: α-cellulose, pentosans, lignin, European pine wood pulp, starch, and similar materials together with small amounts of kerosene. This waste material contained no residual chlorine or other bactericidal matter. The pH of the untreated waste material was 8.3. The pH of two 30-ml. samples of this waste was corrected to 7.0 and the samples were diluted to a 10% concentration with 270 ml. of water. The B. O. D. of the dilution water was less than 0.2 P. P. M. Each of these samples was seeded with 33.3 ml. per liter of four-day old Musconetcong River water. To one of these samples was added one grain per gallon (17.12 P. P. M.) of the above-described $a,a$-dimethylbenzyl hydroperoxide material. Both samples were then incubated at a temperature of 20° C. for five days. The B. O. D. of each of these samples was determined at daily intervals. The results of these determinations are recorded in Table 1.

Table 1

| Days | B. O. D. | |
|---|---|---|
| | Untreated Sample | Sample Treated with $a,a$-Dimethylbenzyl Hydroperoxide |
| 1 | 2.5 | 0 |
| 2 | 6.5 | 2.0 |
| 3 | 10.0 | 4.5 |
| 4 | 13.5 | 5.0 |
| 5 | 16.0 | 6.0 |

The above-recorded results clearly indicate the efficaciousness of $a,a$-dimethylbenzyl hydroperoxide in reducing the B. O. D. of the particular paper mill waste treated.

EXAMPLE II

The same $a,a$-dimethylbenzyl hydroperoxide material as that employed in Example I was tested. The effluent waste from a paper mill was again utilized. In this case, however, the organic matter present in the waste treated consisted primarily of $a$-cellulose, European pine wood pulp, starch, and the like. This waste contained 2.0+ P. P. M. of residual chlorine and had a pH of 5.3. The residual chlorine present in a large sample of this waste material was removed by treatment with sodium thiosulfite and the pH thereof was adjusted to 6.81 with sodium carbonate. Six 30-ml. portions of this large sample were measured into glass containers and diluted to 10% concentration with 270 ml. of water. The B. O. D. of the dilution water was less than 0.2 P. P. M. Each of these diluted samples was seeded with 33.3 ml. per liter of Musconetcong River water. To three of these samples was added one grain per gallon (17.12 P. P. M.) of the $a,a$-dimethylbenzyl hydroperoxide material to be tested. All of the samples were then incubated for seven days at 20° C. One untreated sample and one sample treated with the $a,a$-dimethylbenzyl hydroperoxide were reseeded with 33.3 ml. per liter of Musconetcong River water at the end of the first 24 hours of incubation. Two similar samples were twice reseeded in a like manner, once at the end of the first 24 hours of incubation and again at the end of the first 48 hours of incubation. The B. O. D. of the various samples was determined at intervals as indicated in Table 2.

Table 2
[B. O. D.]

| Days | Untreated Sample | Sample Treated with $a,a$-Dimethylbenzyl Hydroperoxide | Untreated Sample and Reseeded Once after 24 Hours' Incubation | Sample Treated with $a,a$-Dimethylbenzyl Hydroperoxide and Reseeded Once after 24 Hours' Incubation | Untreated Sample and Reseeded Twice at 24-Hour Intervals | Sample Treated with $a,a$-Dimethylbenzyl Hydroperoxide and Reseeded Twice at 24-Hour Intervals |
|---|---|---|---|---|---|---|
| 1 | 7.0 | 3.0 | | | | |
| 2 | 14.0 | 9.0 | 14.0 | 10.0 | | |
| 3 | 20.5 | 14.0 | 19.5 | 15.0 | 20.0 | 14.0 |
| 4 | | | | | | |
| 5 | 23.5 | 16.5 | 29.0 | 15.5 | 27.0 | 17.5 |
| 6 | 31.5 | 17.5 | 31.0 | 19.5 | 30.0 | 18.5 |

These results clearly indicate the effectiveness of the $a,a$-dimethylbenzyl hydroperoxide utilized as an agent for reducing the B. O. D. of the paper mill waste treated. Furthermore, this effectiveness was maintained throughout a seven-day incubation period.

EXAMPLE III

The same $a,a$-dimethylbenzyl hydroperoxide material as that described in Example I was utilized. In this case, however, the organic matter contained in the paper mill waste treated consisted primarily of European pine wood pulp, cellulose, and similar materials. Some kerosene was also present. This waste contained no residual chlorine or other bactericidal material and was characterized by a pH of 6.5. No pH adjustment was made. Six 150-cc. samples of this waste were diluted to 50% concentration in glass containers by the addition of 150 cc. of water. The B. O. D. of the dilution water was less than 0.2 P. P. M. All six of these samples were seeded with 33.3 ml. per liter of Musconetcong River water taken above Hughesville, New Jersey. To three of these samples was added one grain per gallon (17.12 P. P. M.) of the $a,a$-dimethylbenzyl hydroperoxide material. All of the samples were incubated at 20° C. for several days as indicated in Table 3. One untreated sample and one sample containing $a,a$-dimethylbenzyl hydroperoxide were reseeded once after the first 24 hours of incubation with 33.3 ml. per liter of the same Musconetcong River water. Another similar pair of samples was twice reseeded in like manner, first after 24 hours of incubation and again after 48 hours of incubation. The B. O. D. of the various samples was determined at daily intervals as indicated in Table 3.

Table 3
[B. O. D.]

| Days | Untreated Sample | Sample Treated with α,α-Dimethylbenzyl Hydroperoxide | Untreated Sample and Reseeded Once after 24 Hours' Incubation | Sample Treated with α,α-Dimethylbenzyl Hydroperoxide and Reseeded Once after 24 Hours' Incubation | Untreated Sample and Reseeded Twice at 24-Hour Intervals | Sample Treated with α,α-Dimethylbenzyl Hydroperoxide and Reseeded Twice at 24-Hour Intervals |
|---|---|---|---|---|---|---|
| 1 | 0.8 | 0 | | | | |
| 2 | 1.4 | 0.2 | 1.2 | 0.5 | | |
| 3 | 4.2 | 0.8 | 4.2 | 1.3 | 4.2 | 0 |
| 4 | 5.0 | 1.2 | 4.8 | 1.8 | 6.6 | 1.6 |
| 5 | 6.0 | 1.6 | 6.0 | 2.2 | 7.4 | 2.0 |
| 6 | | | 6.2 | 4.0 | 8.0 | 2.6 |
| 7 | | | | | 8.5 | 3.0 |

These results clearly indicate the remarkable ability of the α,α-dimethylbenzyl hydroperoxide used to effect a substantial reduction in the B. O. D. of the waste material treated. The α,α-dimethylbenzyl hydroperoxide is particularly advantageous for the reason that its effectiveness is not immediately dissipated but still obtains after seven days' incubation as indicated by the above-recorded data.

EXAMPLE IV

The same α,α-dimethylbenzyl hydroperoxide material as that described in Example I was employed to reduce the B. O. D. of the contents of a settling pond utilized for the purpose of stabilizing paper mill wastes. This settling pond water contained large amounts of waste organic materials resultant from the manufacture of various types of paper. These organic materials consisted of wood pulp of various types, cellulose, lignins, etc., in various states of decomposition. The settling pond water employed was free of residual chlorine and other bactericidal matter and had a pH of 7.3. Two 30-ml. samples of this water, unaltered in any way, either by dilution or otherwise, were placed in glass containers. To one of these samples was added one grain per gallon (17.12 P. P. M.) of the α,α-dimethylbenzyl hydroperoxide material. The samples were then incubated at 20° C. for five days. The B. O. D. of each of these samples was determined at daily intervals. The results of these determinations are recorded in Table 4.

Table 4
[B. O. D.]

| Days | Untreated Sample | Sample Treated with One Grain Per Gallon of α,α-Dimethylbenzyl Hydroperoxide | Percentage Increase in Reduction in B. O. D. of Treated Sample over Untreated Sample |
|---|---|---|---|
| 1 | 0.8 | 0.2 | 75 |
| 2 | 1.8 | 1.8 | 0.0 |
| 3 | 2.7 | 2.0 | 25 |
| 4 | 3.6 | 2.25 | 40 |
| 5 | 4.4 | 2.5 | 45 |

The above-recorded data serve to delineate the outstanding efficiency of the α,α-dimethylbenzyl hydroperoxide employed as an agent for reducing the B. O. D. of the settling pond water.

EXAMPLE V

The same α,α-dimethylbenzyl hydroperoxide material as that described in Example I was employed. The waste utilized was again derived from the manufacture of paper. The organic material contained in this waste consisted primarily of the following: α-cellulose, pentosans, lignins, European pine wood pulp, rag pulp, and similar materials. This waste material contained no residual chlorine or other bactericidal matter. The pH of this waste was 10.0. Six 30-ml. samples of this waste were placed in glass bottles and the pH of each sample was adjusted to 7.3. The samples were then diluted to a 10% concentration by the addition of 270 ml. of water. The B. O. D. of the dilution water was less than 0.2 P. P. M. All of the samples were seeded with 33.3 ml. per liter of Musconetcong River water. To three of these samples was added one grain per gallon (17.12 P. P. M.) of the α,α-dimethylbenzyl hydroperoxide material. The samples were incubated for from five to seven days as indicated in Table 5. One sample treated with the α,α-dimethylbenzyl hydroperoxide material and one untreated sample were reseeded with 33.3 ml. per liter of Musconetcong River water after the first 24 hours of incubation. Another such set of samples was so reseeded at the end of the first 24 hours of incubation and again at the end of the second 24 hours of incubation. The B. O. D. of these samples was determined at daily intervals as indicated in Table 5. These data clearly indicate that α,α-dimethylbenzyl hydroperoxide is unusually effective throughout an extended period in reducing the B. O. D. of the waste material treated.

Table 5
[B. O. D.]

| Days | Untreated Sample | Sample Treated with α,α-Dimethylbenzyl Hydroperoxide | Untreated Sample and Reseeded Once after 24 Hours' Incubation | Sample Treated with α,α-Dimethylbenzyl Hydroperoxide and Reseeded Once after 24 Hours' Incubation | Untreated Sample and Reseeded Twice at 24-Hour Intervals | Sample Treated with α,α-Dimethylbenzyl Hydroperoxide and Reseeded Twice at 24-Hour Intervals |
|---|---|---|---|---|---|---|
| 1 | 3.0 | 0.0 | | | | |
| 2 | 12.0 | 9.0 | 10.0 | 8.0 | | |
| 3 | 20.0 | 13.0 | 19.0 | 16.0 | 20.0 | 12.0 |
| 4 | 34.0 | 15.0 | 29.0 | 17.0 | 30.0 | 14.0 |
| 5 | 60.0 | 22.0 | 36.0 | 18.0 | 49.0 | 24.0 |
| 6 | | | 54.0 | 20.0 | 51.0 | 30.0 |
| 7 | | | | | 62.0 | 31.0 |

The surprising efficaciousness of the α,α-dimethylbenzyl hydroperoxide employed as a means for reducing the B. O. D. of the paper mill waste treated is amply illustrated by the above-recorded data.

EXAMPLE VI

The same α,α-dimethylbenzyl hydroperoxide material as that described in Example I was employed to reduce the B. O. D. of waste liquor obtained from a pulp and paper company. This waste liquor contained substantial amounts of cellulose, lignins, organic chemicals utilized in paper manufacture, and other similar materials.

In carrying out this test, the paper mill waste was diluted to a 0.5% concentration. This concentration was selected for the reason that it demonstrated approximately a 60% depletion of the initial oxygen demand after five days' incubation at 20° C. (American Public Health Association recommends the use of dilutions showing from 40 to 70% depletion of the initial oxygen demand when so incubated). The B. O. D. of the dilution water employed was less than 0.2 P. P. M.

Two samples of this diluted waste liquor were withdrawn. The pH of one of these samples was adjusted to 6.5 and the pH of the other sample was adjusted to 7.5. Each of these samples was then divided into eight aliquot portions. To four such portions of each sample was added 50 P. P. M. of the α,α-dimethylbenzyl hydroperoxide material to be tested. The eight aliquot portions of each original sample were then divided into four sets, each consisting of one portion treated with the α,α-dimethylbenzyl hydroperoxide material and one untreated portion. Each of these sets was agitated for the length of time indicated in Table 6. The B. O. D. of each of these eight samples was then determined. The results of these B. O. D. determinations are recorded in Table 6.

Table 6

| Sample | pH | B. O. D. | | | |
|---|---|---|---|---|---|
| | | No Agitation | 15 Min. Agitation | 30 Min. Agitation | 8 Hr. Agitation |
| Treated with 50 P. P. M. α,α-dimethylbenzyl hydroperoxide | 6.5 | | 300 | 250 | 140 |
| Untreated | 6.5 | | 820 | 810 | 530 |
| Treated with 50 P. P. M. α,α-dimethylbenzyl hydroperoxide | 7.5 | 200 | 94 | 76 | 0.0 |
| Untreated | 7.5 | | 800 | 456 | 524 |

These results clearly indicate the surprising ability of α,α-dimethylbenzyl hydroperoxide to reduce the B. O. D. of the waste material treated.

EXAMPLE VII

The α,α-dimethylbenzyl hydroperoxide material described in Example I was utilized in conjunction with aeration to effect a reduction in the B. O. D. of the waste water effluent from a synthetic resin manufacturing plant. The organic material contained in this waste water consisted of resins oils, rosin, tall oil, terpenes, sanitary sewage, and similar material.

For the purpose of conducting this test, two five-gallon containers of the raw effluent from the synthetic resin manufacturing plant were obtained. The pH of this effluent material was adjusted to 7.0 and the samples were then seeded with one ml. per liter of sanitary sewage. To one sample was added one grain per gallon (17.12 P. P. M.) of the α,α-dimethylbenzyl hydroperoxide material hereinbefore described. The B. O. D. of the sample was determined immediately after the addition of the hydroperoxide. Both samples were then subjected to aeration which was effected by bubbling air through a stick-type frittered glass diffuser under a pressure of four inches of mercury. The B. O. D. of portions of each sample withdrawn after 2, 10, and 60 minutes of aeration was determined. The results of these B. O. D. determinations are recorded in Table 7.

Table 7

| Sample Tested | B. O. D. of Raw Sewage Untreated with α,α-Dimethylbenzyl Hydroperoxide and Seeded with Sanitary Sewage | B. O. D. of Raw Sewage Treated with 17.12 P. P. M. α,α-Dimethylbenzyl Hydroperoxide and Seeded with Sanitary Sewage |
|---|---|---|
| Raw sewage | 340 | 305 |
| Immediately after adding 17.12 P. P. M. α,α-dimethylbenzyl hydroperoxide | | 175 |
| After 2 minutes' aeration | 203 | |
| After 10 minutes' aeration | 185 | 163 |
| After 60 minutes' aeration | 185 | 155 |

These results indicate the unusual effectiveness of α,α-dimethylbenzyl hydroperoxide in reducing the B. O. D. of water containing organic matter when used in conjunction with aeration. As was true, when the α,α-dimethylbenzyl hydroperoxide was merely added to the waste to be treated as in previous examples, the beneficial effects thereof were maintained throughout the testing period.

EXAMPLE VIII

The same waste material and the same α,α-dimethylbenzyl hydroperoxide material as that utilized in Example VII were employed. In this instance, however, the α,α-dimethylbenzyl hydroperoxide material was merely added to the diluted waste and the mixture was permitted to stand undisturbed.

In carrying out this test, two five-gallon bottles of raw waste were obtained. The pH of these samples was adjusted to 7.0. The samples were then seeded with one ml. per liter of sanitary sewage. One grain per gallon (17.12 P. P. M.) of the α,α-dimethylbenzyl hydroperoxide material was added to one of these samples and ten grains per gallon (171.2 P. P. M.) of the α,α-dimethylbenzyl hydroperoxide material was added to the other sample. Portions of each of these samples were diluted to a 2% concentration and the B. O. D. of these diluted portions was determined as indicated in Table 8. The dilution water utilized had a B. O. D. of approximately 0.2 P. P. M.

Table 8

| Sample | Sample Containing One Grain Per Gallon of α,α-Dimethylbenzyl Hydroperoxide, B. O. D. | Sample Containing Ten Grains Per Gallon of α,α-Dimethylbenzyl Hydroperoxide, B. O. D. |
|---|---|---|
| | P. P. M. | P. P. M. |
| Raw sewage, initial sample after seeding | 100 | 100 |
| Raw sewage, immediately after addition of α,α-dimethylbenzyl hydroperoxide | 45 | 15 |
| After standing 1 day | 45 | |
| After standing 2 days | 22 | |
| After standing 4 days (4% concentration) | | 24 |

It is apparent from the data recorded in Table 8 that α,α-dimethylbenzyl hydroperoxide is quite as effective in reducing the B. O. D. of waste material effluent from the synthetic resin manufacturing plant as it is in reducng the B. O. D. of the other waste materals previously employed.

As previously mentioned, the α,α-dialkylarylmethyl hydroperoxides of this invention support the aerobic oxidation of organic matter such as that normally found in sewage and industrial wastes. In addition, these α,α-dialkylarylmethyl hydroperoxides effect some direct chemical oxidation of the organic materials treated and of the gases resultant from the biological decomposition processes.

The process with which this invention is concerned is particularly advantageous when utilized in the treatment of sanitary domestic sewage and industrial wastes containing organic matter. These materials are normally characterized by a very high B. O. D. as a consequence of the presence of carbohydrates such as sugars, starches, and cellulose; proteins or proteinaceous material of animal or vegetable origin; fats, waxes, oils, and the like; organic compounds such as ethers, alcohol, ketones, acids, amino compounds, aromatic compounds; and the like; lignin; and other materials of organic nature. All of these various types of organic matter, in addition to the other types which may be encountered either alone or in any combination, may be treated in accordance with the process of this invention with a resultant substantial reduction in the B. O. D. of the waste material in which they may be contained.

The α,α-dialkylarylmethyl hydroperoxides utilized in the practice of this invention may be prepared by the oxidation of alkyl-substituted aromatic organic compounds having the structural formula

in which $R_1$ and $R_2$ represent alkyl groups and Ar represents a substituent selected from the group consisting of aryl and alkaryl groups. The oxidation may be carried out in the liquid phase utilizing air or molecular oxygen as the oxidizing agents. A preferred method of preparing these hydroperoxides involves the liquid phase oxidation of the alkyl-substituted aromatic organic compounds having the above structural formula by passing an oxygen-containing gas through the compounds at a temperature between about 25° C. and about 95° C. in teh preesnce of an aqueous alkali. The concentration of the aqueous alkali may be between about 1% and about 35%, although it is preferabl to use concentrations of about 2% to about 8%. Vigorous agitation is desirable during the oxidation reaction. Although all of the organic hydroperoxides embraced by the structural formula previously mentioned are operable, α,α-dimethyl-p-methylbenzyl hydroperoxide, α,α-dimethylbenzyl hydroperoxide, α,α-dimethyl-p-isopropylbenzyl hydroperoxides, α,α,α',α'-tetramethyl-p-xylylene dihydroperoxide, α-ethyl-α-methylbenzyl hydroperoxide, and α,α-dimethylnaphthylmethyl hydroperoxide are preferred. Particularly preferred is α,α-dimethylbenzyl hydroperoxide.

In the practice of this invention, several modifications of the hydroperoxide material may be utilized. The hyydroperoxide may be used, for example, either in the form of the pure hydroperoxide or in the form of a crude reaction mixture containing the hydroperoxide and obtained by the oxidation with air or oxygen of an alkyl-substituted aromatic organic compound having the structural formula shown previously. When the hydroperoxide is obtained by such an oxidation, the oxidation usually is interrupted before all of the hydrocarbon has reacted in order to avoid or limit side reactions. In this manner, the α,α-dialkylarylmethyl hydroperoxide is obtained in mixture with smaller or larger amounts of the original hydrocarbon, which is an α,α-dialklyarylmethane, and the mixture also may contain secondary reaction products such as the corresponding alcohols, which are α,α-dialkylarylmethyl alcohols. The oxidation of cumene, for example, leads to a reaction product containing α,α-dimethylbenzyl hydroperoxide, α,α-dimethylbenzyl alcohol, a small amount of acetophenone, and unchanged cumene. Such a reaction product may be used per set in the process of this invention. In case it is desirable, however, to obtain the hydroperoxide in a more concentrated form, the hydroperoxide may be separated from the other constituents of the crude reaction mixture. The hydroperoxides may be separated from the raction mixtures by, for example, fractional distillation at very low pressures, of the order of 0.01 to 1.0 mm./sq. cm., the hydroperoxides having higher boiling points than the related hydrocarbon, alcohol, and ketone. In some instances, the hydroperoxides also may be separated from the oxidation reaction mixtures by crystallization, which may be facilitated by first distilling off at least part of the hydrocarbon. Steam distillation usually is sufficient to remove the hydrocarbon. Many of these α,α-dialkylarylmethyl hydroperoxides are insoluble or difficulty soluble in water.

The process of this invention may be practiced merely by admixing the desired amount of the α,α-dialkylarylmethyl hydroperoxide utilized with the material to be treated and permitting the mixture to remain undisturbed for a time. The length of time which the mixture should be permitted to stand, of course, depends upon the nature of the sewage treated, the temperature, the amount of α,α-dialkylarylmethyl hydroperoxide employed, and the like. Two days' standing is usually sufficient to effect adequate reduction in the B. O. D. of the material treated. In some cases, however, four or more days may be required. If desired, the material to be treated may be diluted prior to, during, or after the addition of an α,α-dialkylarylmethyl hydroperoxide. If the material undergoing treatment is devoid of the aerobic bacteria essential to the biological decomposition of the organic matter contained therein, or contains but insignificant numbers of such bacteria, it may be desirable to seed the material with these organisms. This may be effected by the addition of sanitary sewage or other like matter in which the necessary organisms are known to abound, or by other methods known to the art. Substantial reduction in B. O. D. may be achieved as hereinbefore mentioned by the organic peroxides by means of direct oxidation. Hence, the presence of aerobic bacteria is not necessarily essential.

This invention may, of course, also be utilized in conjunction with standard sewage and waste disposal systems. Thus, the α,α-dialkylarylmethyl hydroperoxides may be added to the waste or sewage prior to or during its passage through aeration apparatus, contact beds, activated sludge tanks, trickling filters, intermittent sand filters, and the like to achieve a more substantial reduction in the B. O. D. of the material treated than is possible to obtain by the use of these sewage treatment devices alone. Excessive aeration or agitation may, in some instances, result in the loss by evaporation of a large part of the hydroperoxide material. Care should be taken to obviate this occurrence.

A particular advantage attends the utilization of the organic peroxides in conjunction with these conventional sewage treatment devices. In the case of contact beds and intermittent sand filters, if the sewage or other waste is retained for too great a time, the system becomes septic as a consequence of the death of the bacteria originally present. Likewise, in the case of activated sludge tank, the waste is aerated prior to treatment for the purpose of incorporating oxygen necessary to sustain the life of the bacteria contained in the tank. In normal trickling filter operation, the dissolved oxygen essential to the life of the bacteria is incorporated into the waste by spraying it onto the filter bed. The organic hydroperoxides of this invention provide a relatively constant source of oxygen and hence permit longer retention in contact beds and intermittent filters of the waste materials undergoing treatment. Likewise, the period of aeration necessary prior to introduction of waste into an activated sludge tank may be reduced. Furthermore, a higher rate of application of waste to trickling beds is made possible by virtue of the organic hydroperoxides with which this invention is concerned. The α,α-dialkylarylmethyl hydroperoxides may, of course, also be added to the effluent from any of the above-mentioned or other sewage or waste treatment devices to effect a still further reduction in the B. O. D. of such effluent prior to ultimate discharge into a natural watercourse. In some instances, seeding with aerobic bacteria as hereinbefore described may be desirable.

It is common practice in the sewage and disposal art to effect some dilution of the raw sewage prior to treatment. Such dilution is desirable, although not essential, prior to the utilization of the α,α-dialkylarylmethyl hydroperoxides in accordance with the process of this invention. The extent of dilution will, of course, depend upon the nature of the sewage treated, the mechanical devices utilized, if any, and the like. In any event, those skilled in the art will experience no difficulty in determining the proper extent of dilution which should be employed under any particular conditions.

The α,α-dialkylarylmethyl hydroperoxides with which this invention is concerned may be utilized in varying concentrations. The optimum concentration to employ will, of course, vary with the original B. O. D. of the sewage treated, the extent of dilution, the bacteria present, the temperature employed, and the method of sewage treatment utilized. Those skilled in the art will find no difficulty in determining the proper concentration to employ under any particular conditions. Preferably, however, it is desired to employ such an amount of the α,α-dialkylarylmethyl hydroperoxide that there is present, after dilution, if any, from about 10 to about 200 P. P. M. thereof in the diluted material to be treated.

Although this invention has been described primarily with respect to the treatment of sanitary sewage and industrial wastes, it is to be understood that it is not limited to such materials but includes the reduction of B. O. D. of any liquid material contaminated with organic matter, whether that organic matter be present in solution, dispersion, or otherwise. Likewise, emphasis has been placed upon the utilization of the organic peroxides of this invention for the purpose of sustaining the life of the aerobic bacteria which effect decomposition of organic matter. It is to be understood, however, that these peroxides may also be utilized for the purpose of effecting a reduction in B. O. D. by the direct oxidation of organic materials contained in a particular aqueous medium.

In so far as the biological decomposition of organic matter is concerned, a unique advantage attends the utilization of the α,α-dialkylarylmethyl hydroperoxides of this invention. It has been discovered that colonies of bacteria grown in the presence of these hydroperoxides demonstrate a greater vitality than similar bacteria propagated in normal sewage treatment processes. Furthermore, in the presence of the organic hydroperoxides of this invention, the bacteria demonstrate a rate of growth greater than that which normally obtains. These factors are, of course, of great significance in effecting substantial reduction in the B. O. D. of the materials treated. More virile strains of other bacteria, such as those essential to fermentation or the production of various molds such as those from which penicillin is obtained, result from the propagation thereof in the presence of the α,α-dialkylarylmethyl hydroperoxides of this invention.

The discovery of a practical and economical method of treating waste liquids containing organic matter so that they may be safely discharged in large quantities into the natural watercourses of the nation without detrimental effect upon the fauna and flora thereof has constituted a significant problem in the art. This problem has been particularly vexacious to large industries which normally produce large quantities of wastes of very high B. O. D. By virtue of this invention, there is presented a practical and economical solution to this problem.

What we claim and desire to protect by Letters Patent is:

1. The process of reducing the biological oxygen demand of an aqueous liquid medium containing organic matter which comprises admixing with said aqueous liquid medium an α,α-dialkylarylmethyl hydroperoxide in the amount of from about 10 to about 200 parts per million parts of said aqueous liquid medium.

2. The process of claim 1 wherein the α,α-dialkylarylmethyl hydroperoxide is α,α-dimethylbenzyl hydroperoxide.

3. The process of claim 1 wherein the aqueous liquid medium is waste effluent from a synthetic resin manufacturing industry.

4. The process of claim 1 wherein the aqueous liquid medium is paper mill waste.

5. The process of claim 4 wherein the α,α-dialkylarylmethyl hydroperoxide is α,α-dimethylbenzyl hydroperoxide.

JOSEPH N. BORGLIN.
IRENE WOODCOCK.

REFERENCES CITED

The following references are of record in the file of this patent:

UNITED STATES PATENTS

| Number | Name | Date |
| --- | --- | --- |
| 2,070,856 | Butterfield | Feb. 16, 1937 |
| 2,236,930 | Uytenbogaart | Apr. 1, 1941 |

FOREIGN PATENTS

| Number | Country | Date |
| --- | --- | --- |
| 538,461 | Great Britain | Aug. 5, 1941 |

Certificate of Correction

Patent No. 2,576,442 November 27, 1951

JOSEPH N. BORGLIN ET AL.

It is hereby certified that error appears in the printed specification of the above numbered patent requiring correction as follows:

Column 4, line 34, for "examination" read *Examination*; column 7, line 30, for "purpore" read *purpose*; column 11, line 22, for "reducng" read *reducing*; column 12, line 1, for "preferabl" read *preferable*; line 8, for "hydroperoxides" read *hydroperoxide*; line 16, for "hyydroperoxide" read *hydroperoxide*; line 38, for "per set" read *per se*; line 55, for "difficulty" read *difficultly*; and that the said Letters Patent should be read as corrected above, so that the same may conform to the record of the case in the Patent Office.

Signed and sealed this 4th day of March, A. D. 1952.

[SEAL]

THOMAS F. MURPHY,
*Assistant Commissioner of Patents.*